(No Model.) 5 Sheets—Sheet 2.
J. & I. P. KISSELL.
MACHINE FOR APPLYING WRAPPERS TO NEWSPAPERS.
No. 543,873. Patented Aug. 6, 1895.
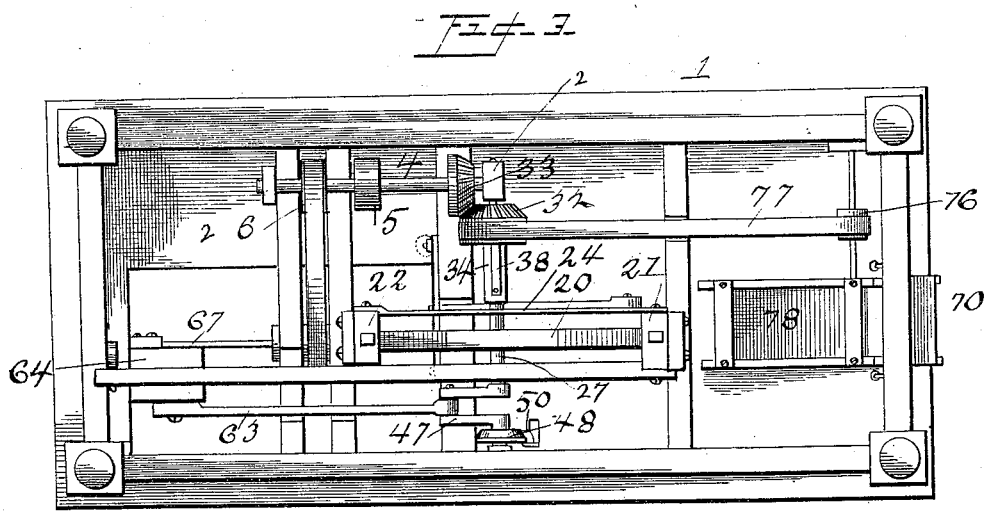
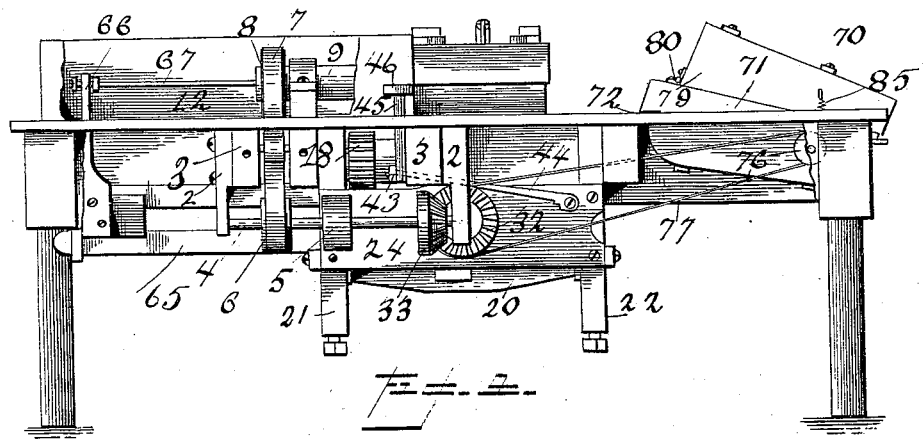
Witnesses:
Inventors
Jonas Kissell
Isaac P. Kissell
By J. R. Nottingham
Attorney.

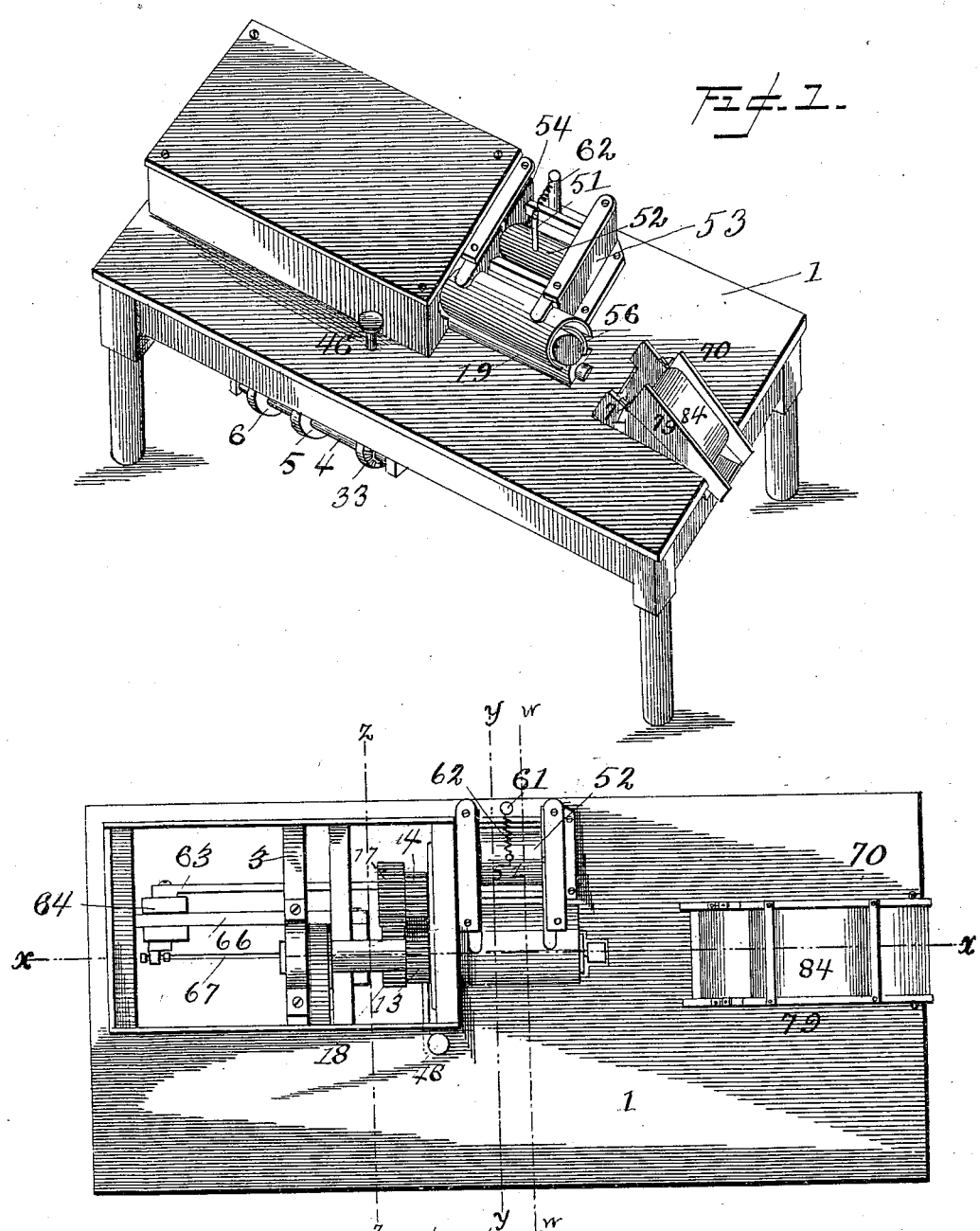

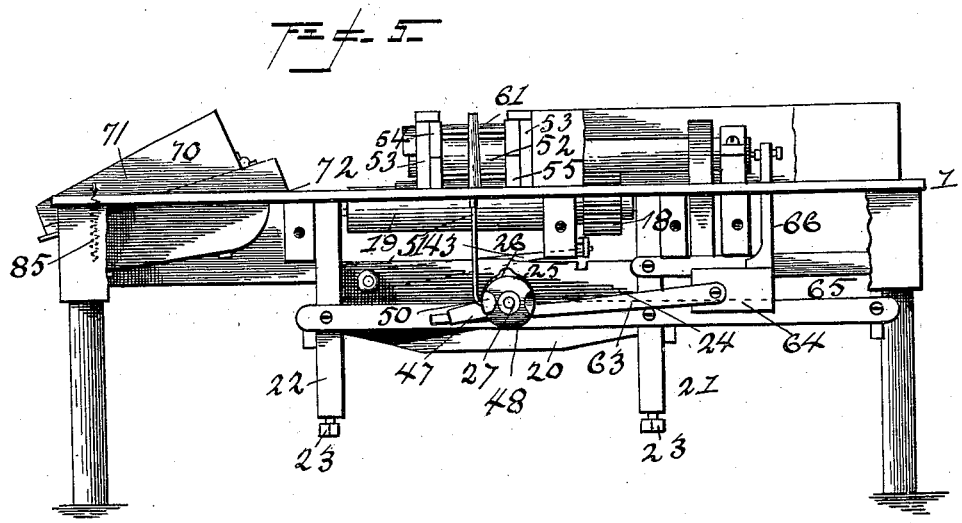
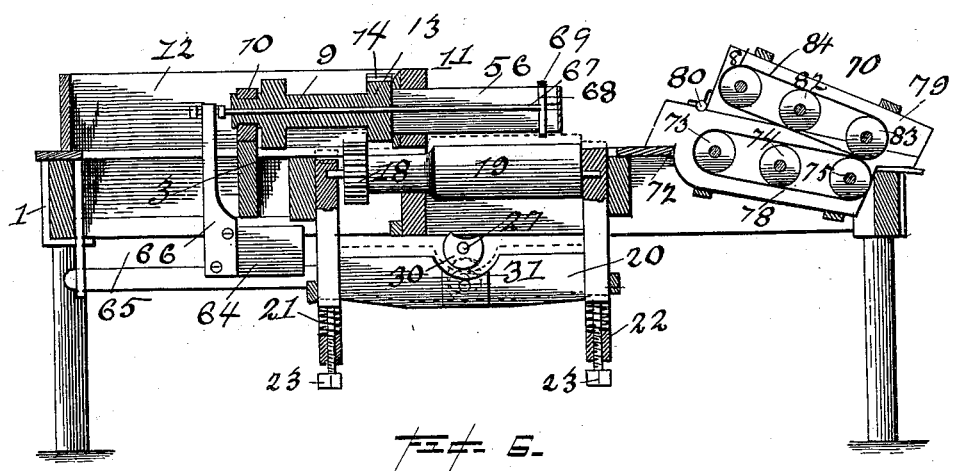

(No Model.) 5 Sheets—Sheet 4.
J. & I. P. KISSELL.
MACHINE FOR APPLYING WRAPPERS TO NEWSPAPERS.
No. 543,873. Patented Aug. 6, 1895.
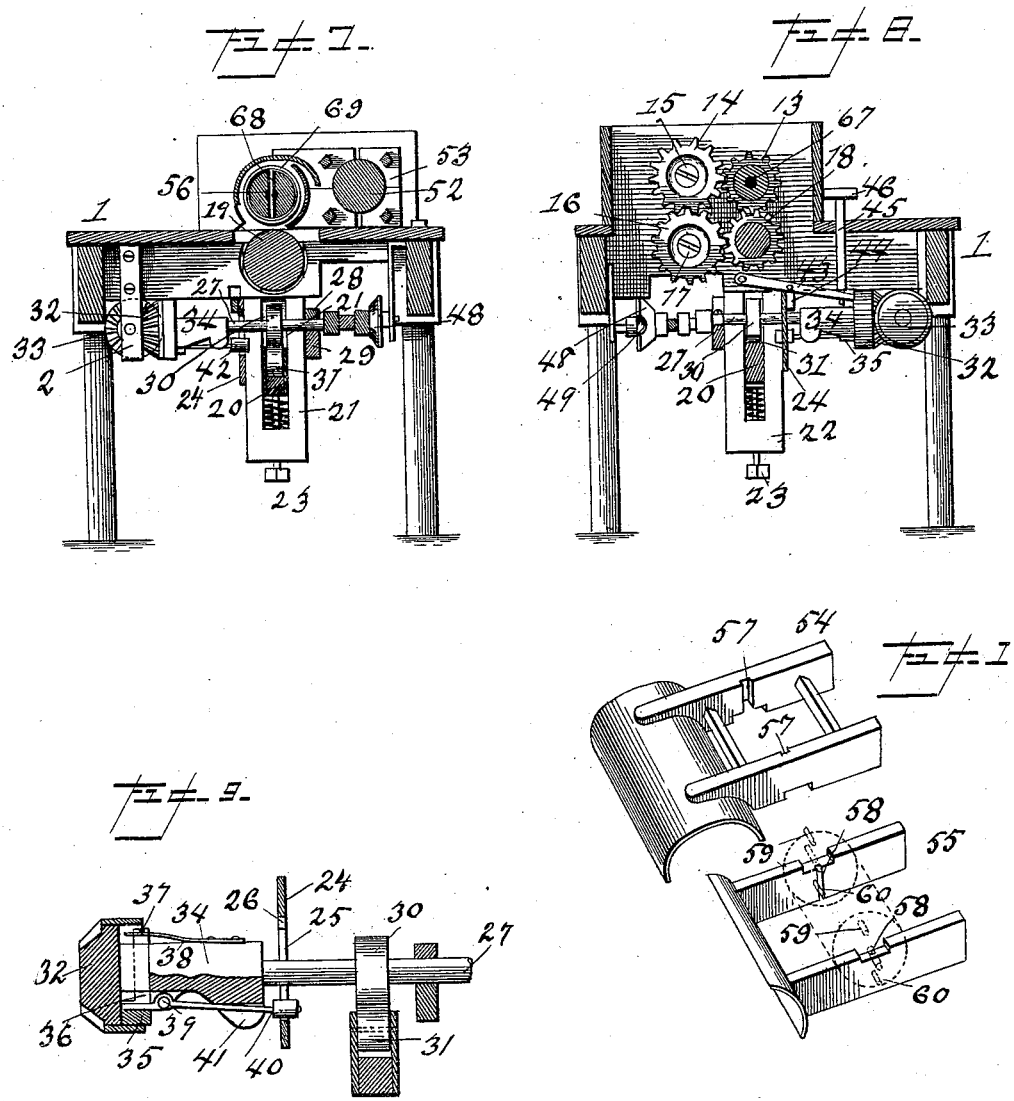

(No Model.)  5 Sheets—Sheet 5.
J. & I. P. KISSELL.
MACHINE FOR APPLYING WRAPPERS TO NEWSPAPERS.
No. 543,873.  Patented Aug. 6, 1895.

WITNESSES-
T. W. Johnson,
James H. Jester,

INVENTORS-
Jonas Kissell and
Isaac P. Kissell
By J. R. Nottingham
Atty.

UNITED STATES PATENT OFFICE.

JONAS KISSELL AND ISAAC P. KISSELL, OF McCOMB, OHIO.

MACHINE FOR APPLYING WRAPPERS TO NEWSPAPERS.

SPECIFICATION forming part of Letters Patent No. 543,873, dated August 6, 1895.

Application filed February 5, 1894. Serial No. 499,126. (No model.)

*To all whom it may concern:*

Be it known that we, JONAS KISSELL and ISAAC P. KISSELL, citizens of the United States, residing at McComb, in the county of Hancock and State of Ohio, have invented certain new and useful Improvements in Machines for Applying Wrappers to Newspapers; and we do hereby declare the following to be a full, clear, and exact description of the invention, such as will enable others skilled in the art to which it appertains to make and use the same.

This invention relates to certain improvements in machines for wrapping newspapers and other similar articles for transmission through the mails; and it has for its objects, first, to provide for folding a newspaper or pamphlet; second, for securing a wrapper around the same; third, for delivering the wrapped article to a compressor, and, fourth, for compressing said wrapped article and delivering it ready for mailing, as will be hereinafter explained and specifically set forth in the claims.

The above-mentioned objects are attained by the mechanism illustrated in the accompanying drawings, in which—

Figure 11:
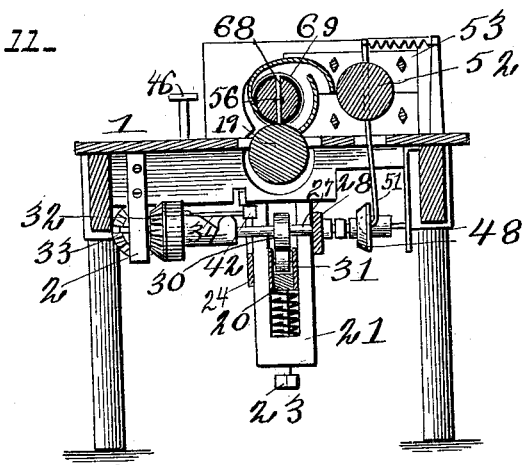
Figure 12:
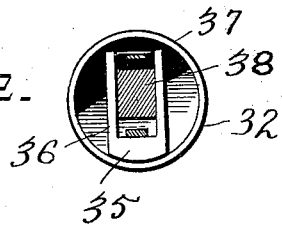

Figure 1 represents a perspective view of our improved machine; Fig. 2, a top plan view of the same, the cover to the housing being removed to show the operating mechanism below; Fig. 3, a bottom plan view; Fig. 4, a front elevation, with a portion of the table or support broken away, showing the parts in operative position for applying the wrapper to a paper or pamphlet; Fig. 5, a rear elevation with a portion of the table broken away, showing the parts in the position they assume after the wrapper has been applied, and the wrapped parcel delivered to the compressor; Fig. 6, a longitudinal vertical section on line *x x* of Fig. 2; Fig. 7, a transverse vertical section on line *y y* of said Fig. 2, looking in the direction of the arrow; Fig. 8, a similar section on line *z z* of Fig. 2, looking in the reverse direction; Fig. 9, a detail view, somewhat enlarged, of the transverse shaft and clutch mechanisms; Fig. 10, detail views of the drum and guides; Fig. 11, a transverse sectional view taken on line *w w* of Fig. 2, and Fig. 12 is a plan view of the inner side of the miter gear-wheel, showing the clutch mechanism in section.

Referring to the drawings, the numeral 1 indicates the table or stand which support the various working parts of the machine.

The numeral 2 indicates two hangers, which are secured to cross-beams 3, below the top of the table, and are provided with suitable bearings for the journals of the driving-shaft 4 of the machine. Keyed or otherwise secured to said driving-shaft is a driving-pulley 5, to which motion may be imparted by means of a belt running to any suitable source of power. The driving-shaft is provided with a similar pulley 6, which is connected by a belt 7 with a pulley 8, mounted on a hollow shaft 9, which has one end journaled in a bearing-block 10, secured on one of the cross-beams 3, and the other end in a bearing-plate 11, secured to one end of a housing 12, secured to the table-top around an opening made in said top to accommodate the gearing by means of which the wrapping devices are operated.

To the hollow shaft 9 is secured a cog-wheel 13, which intergears with a cog-wheel 14, mounted loosely on a stud 15 projecting from the plate 11. A similar cog-wheel 16, mounted loosely on a stud 17, projecting from said plate, intergears with cog-wheel 14 and with a cog-wheel 18 secured to one end of a horizontal pressure-roll 19, whose surface projects through an opening made in the top of the table. The pressure-roll 19 is journaled in the side pieces of a yielding frame 20, which is arranged to slide between ways in stationary hangers 21 and 22 depending from the under side of the table-top. The said yielding frame is pressed normally and yieldingly upward by means of spiral springs, which may be tensioned by set-screws 23. Secured to one side of the hangers 21 and 22 is a plate 24, provided with a circular opening 25, having in its upper edge a semicircular recess 26, the purpose of which will be made apparent.

The numeral 27 indicates a transverse shaft, which has one end journaled in a bearing made in one of the hangers 2, and the other end, after passing through the circular opening 25, journaled in a bearing-block 28 secured to a rail 29, which is fastened to the rear side of the hangers 21 and 22. The shaft 27 is provided at about its center with a cam 30, which acts upon a friction-wheel 31, journaled in the cross-bar of the yielding frame 20, to depress said frame at the proper time. Said shaft, at its forward end, is provided with a loose miter gear-wheel 32, which intermeshes with a miter gear-wheel 33 rigidly mounted on the driving-shaft 4. Said shaft 27 is further provided near its forward end with a clutch-head 34, which sets within a recess made in the side of the miter gearwheel 32 and carries a friction-clutch 35, consisting of a bifurcated or U-shaped plate 36, arranged to slide in grooves made in the opposite sides of the clutch-head and having the ends of its members united by a crossbar 37. Secured to said clutch-head is a leafspring 38, which bears against the said crossbar to hold the clutch normally out of contact with the flange of the miter gear-wheel, so as to permit said wheel to rotate independently of the shaft on which it is mounted. The side of the clutch-head opposite that to which the spring 38 is attached is grooved and provided with lugs 39, between which is fulcrumed a spring-lever 40, the short arm of which sets under the bend of the clutchplate 36. The long arm of said lever passes between guide-lugs 41 and carries at its end an antifriction-roller 42, which is adapted to travel in the circular opening 25 and at the end of its travel to rest normally or when the miter gear-wheel 32 is running loosely in the semicircular recess 26.

The numeral 43 indicates a lever which is centrally fulcrumed on one end of a lever 44, and has one end pivoted on the plate 24 and its other end connected to the lower end of a push-rod 45, which extends up through an opening in the top of the table, the other end of the lever 44 being pivoted to the frame. The upper end of this rod is provided with a knob 46, by means of which it is depressed to operate the lever 43, when necessary to clamp the clutch in the miter gear-wheel 32.

The shaft 27 near its rear end is provided or formed with a crank-arm 47, and with a disk 48 having a depression or recess 49 at one side. Normally resting in said depression or recess is an antifriction-roller 50, which is carried at the lower end of a rod 51 extending up through a slot in the table-top and through a drum 52, which is provided with journals having bearings in vertical side pieces 53, attached to the top of the table. These side pieces form a guideway for two slightly-reciprocating guides 54 and 55, which consists of rectangular frames carrying at their forward ends curved metallic plates, which partly embrace a wrapping-cylinder 56 and serve to guide the paper or pamphlet and its wrapper, as will more fully hereinafter appear. The cylinder 56, it will be observed, is an extension, somewhat enlarged, of the hollow shaft 9, and in connection with the roll 19 forms the feed for the paper or pamphlet and wrapper. The inner sides of the frames are provided with vertical grooves 57 and 58, into which extend pins 59 and 60, arranged diametrically opposite each other at the ends of the drum 52. The end of the rod 51 which projects through said drum is connected with a post 61 by means of a tensioning-spring 62.

Pivoted to the crank-arm 47 is one end of a pitman 63, the other end of said pitman being pivoted to a follower 64, arranged to slide between guideways 65. The said follower carries a vertical arm 66, to the upper end of which is adjustably attached one end of a reciprocating bar 67, arranged to operate through the hollow shaft 9 and the wrappingcylinder 56. The forward or free end of said bar is provided with a cross-bar 68, which works in longitudinal slots made in the wrapping cylinder and carries at its ends an annulus 69, which encircles said cylinder. Said cross-bar and its annulus constitute the device for ejecting the wrapped parcel from the wrapping-cylinder, as will be explained in the operation of the machine.

The numeral 70 indicates a compressor, which consists of an inclined frame 71 let into and held in a suitable opening made in the table-top at the right-hand end of the table. The said frame is pivoted or swiveled at its discharge end to the sides of the opening and has a slight oscillatory movement, said movement being limited at its feed end by recesses 72, which overset the rear edge of said opening. Journaled in the sides of the frame 71 are three pressure-rollers 73, 74, and 75. The journal of roller 75 extends to one side and has secured on its extended end a pulley 76, over which passes a band 77, running from the miter-gear 32, by which motion is imparted to said roller 75. Running over these rollers is an endless conveying-band 78.

Above the inclined frame 71 is situated a similar frame 79, yieldingly secured to the former by means of a hinge-joint 80. This last-mentioned frame is provided with three pressure-rollers 81, 82, and 83, over which pass an endless conveyer-belt 84, which, working in conjunction with the band 77, serves to discharge the wrapped papers, which are flattened by the pressure-rollers in the frames 71 and 79. The upper frame 79 is held yieldingly down onto frame 71 by means of springs 85, so as to accommodate parcels of varying thickness.

The operation of the invention is as follows: The operator stands at the front of the machine with the papers folded to a proper size and the wrappers to be applied properly arranged. The parts being in the position shown in Fig. 4, with the pressure-roller and wrapping-cylinder contacting, paper to be wrapped is placed upon a wrapper cut to proper size and both fed between the roller and cylinder. The paper, together with its accompanying wrapper, will be wound around the cylinder, the operation being assisted by the guides 54 and 55. As soon as the paper and its wrapper are wound around the cylinder the push-rod is depressed, causing the clutch to clamp the miter gear-wheel 32 and set into operation the reciprocating bar carrying the wrapped-paper ejector. As this bar moves forward the ejector forces the wrapped paper off the cylinder and forward to the compressor, where it is caught between the conveyer-belts and carried through between the rollers, which flatten the parcel in its passage through said compressor.

The drum 52, it will be observed, is held normally by the tensioning-spring in such position as to cause the curved guides to bear with a yielding pressure on opposite sides of the wrapping-cylinder; but at the time the ejector is caused to move forward the anti-friction-wheel on the lower end of the rod 51 is withdrawn from the recess 47 in the disk 48 and the said wheel is caused to traverse the outer face of said disk and causes the rod to rock the drum toward the front of the machine. Thus the guides will be moved away from the wrapping-cylinder, allowing for the wrapping of the paper and its ejection from the cylinder.

Having thus fully described our invention, what we claim, and desire to secure by Letters Patent, is—

1. In a machine for applying wrappers to newspapers, the combination, of a revoluble wrapping cylinder, a yieldingly journaled pressure roller, laterally reciprocating guides carrying curved plates, an oscillatory drum located between the frames of said guides, and mechanism for operating said drum, to reciprocate the guides and their curved plates to and from the wrapping cylinder and reversely to each other, substantially as specified.

2. In a machine for applying wrappers to newspapers, the combination of the wrapping cylinder, the pressure roller mounted in a movable frame and mechanism for moving said frame to and from the wrapping cylinder, the laterally reciprocating guides carrying the curved wrapping plates, the oscillatory drum located between the frames of said guides and provided with pins working in grooves in the guides, and mechanism for operating the drum to reciprocate the guides and their curved plates to and from each other, substantially as specified.

3. In a machine for applying wrappers to newspapers, the combination, of the wrapping cylinder, the movable frame carrying the pressure roller, and mechanism for moving the frame and pressure roller to and from the wrapping roller, the reversely movable guides and their curved plates, the oscillatory drum having pins riding in vertical grooves in the guides, the rod extending from said drum downwardly and provided with an anti-friction wheel at its end, and the disk having a recess at one end in which said wheel normally rests, and the mechanism whereby the cam-wheel is operated to operate the folding mechanism, substantially as specified.

4. The combination, with the pressure roller, of a vertically movable frame, in which the journals of said roller have their bearings, the stationary hangers having ways in which the frame slides, springs to keep the frame normally elevated, an anti-friction roller mounted at the center of the lower edge of the said frame, and a cam secured to a transverse shaft, whereby the frame is depressed, substantially as specified.

5. The combination, with the driving shaft, of the cog miter wheel mounted thereon, the cog miter wheel loosely mounted on a transverse shaft and intermeshing with the first mentioned cog-wheel, the clutch mechanism and lever whereby the same is operated, the plate having a central recessed aperture to form a guide for the spring-lever, which is secured to the clutch head and adapted to bind or secure the loose miter cog-wheel to said shaft, substantially as specified.

6. The combination, with the driving-shaft having a band-pulley mounted thereon, the hollow shaft and wrapping-cylinder, a cog-wheel mounted on said hollow shaft and intermeshing with a loosely mounted cog-wheel, the pressure-roller provided with a cog-wheel intermeshing with a second loosely mounted cog-wheel, which intermeshes with the first loosely mounted cog-wheel, and a band-pulley mounted on the hollow-shaft, substantially as specified.

7. In a paper wrapping machine the combination, with the transverse shaft, the cog miter wheel loosely mounted thereon, the clutch-head and spring-lever having an anti-friction roller at its free end, the plate having a circular opening recessed at the top, and the lever fulcrumed to said plate and provided with a push rod, whereby the clutch lever is operated to cause the loose cog wheel to move with the transverse shaft, substantially as specified.

8. In a paper wrapping machine, the combination, with the transverse shaft of the cog wheel loosely mounted thereon, the clutch head mounted on said transverse shaft, the bifurcated clutch plate having a cross connection at its lower end, the leaf-spring secured to the clutch head, and bearing against the cross connection, and the spring lever and its operating lever and push rod, whereby the clutch is thrown into contact with the clutch cog wheel, substantially as and for the purposes specified.

9. The combination, with the horizontal shaft having a disk near one end and provided with a recess at its periphery, of a lever having an anti-friction roller bearing against said disk, a tensioned-drum through which said lever passes, a tension spring to hold the drum in normal position the oppositely sliding frames operated by said drum, and the reciprocating guides for holding the papers to the wrapping-cylinder during the wrapping, substantially as specified.

In testimony whereof we affix our signatures in the presence of two witnesses.

JONAS KISSELL.
ISAAC P. KISSELL.

Witnesses:
LOUIS A. CARABIN,
M. R. SMITH.